Nov. 28, 1944.                H. J. FINDLEY                 2,363,663
                               THREAD INSERT
                            Filed Nov. 12, 1943

INVENTOR.
HOWARD J. FINDLEY
BY
Kwis, Hudson, Doughton & Williams
ATTORNEYS

Patented Nov. 28, 1944

2,363,663

UNITED STATES PATENT OFFICE 2,363,663

THREAD INSERT

Howard J. Findley, Shaker Heights, Ohio, assignor to Eaton Manufacturing Company, Cleveland, Ohio, a corporation of Ohio Application November 12, 1943, Serial No. 509,995

4 Claims. (Cl. 85—46)

This invention relates to thread inserts or bushings of the kind made from helically wound wire and aims to provide a novel insert of this character in which one portion is of a different size or shape than other portions so as to grip one of the threaded members with which the insert is used.

Another object of my invention is to provide a thread insert of the kind mentioned having one or more convolutions in an intermediate portion thereof wound to a smaller size or diameter than its end portions, so as to grip a threaded member when the latter is screwed into the insert.

A further object of my invention is to provide a novel thread insert of the character referred to having a relatively reduced or tapered end portion which facilitates the application of the insert to the threaded opening and grips an externally threaded member when the latter is screwed into the insert.

Other objects and advantages of the invention will be apparent from the following description when taken in conjunction with the accompanying sheet of drawings in which Fig. 1 is a longitudinal sectional view taken through one form of my thread insert and showing the same in an internally threaded opening but without any threaded male member screwed into the insert.

Figure 1:
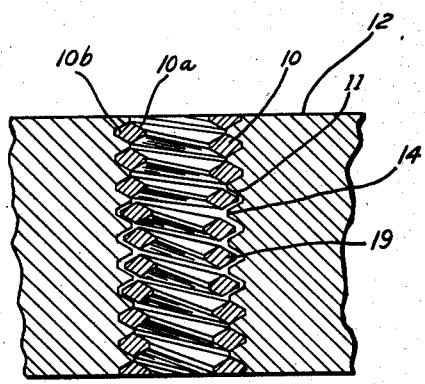

More detailed reference will now be made to Figs. 1 and 2 in which I show one form of my thread insert 10 being used in an internally threaded opening 11 of a female member or body 12 for forming a threaded connection between such member and an externally threaded male member or body 13. The internal thread 14 of the member 12 may be a helical thread of a standard or conventional form which has been cut therein by a tap or other suitable means. The member 12 may be a body or part formed of a relatively soft material such as aluminum, wood, plastic or the like and in which it is desirable to use the insert 10 as a bushing or adapter and for the purpose of obtaining a stronger connection for the externally threaded member 13. In this instance the externally threaded member 13 is a screw having a head 15 and a stem carrying a helical thread 16 of a standard or conventional form and which is of the same pitch as the thread 14 of the member 12. The screw 13 is here shown as being used to clampingly connect a plate 17 or the like with the member 12. A washer 18 may be used under the head of the screw 13.

The insert 10 is formed by helically winding a strand of wire so as to form a bushing or sleeve in which the convolutions have substantially the same pitch as the threads 14 and 16. The wire used in forming the insert 10 is of a double-edged cross-sectional shape such that when wound into an insert or bushing portions of the wire will form a continuous internal thread 10a and oppositely extending portions will form a continuous external thread 10b. In this instance the wire strand is of substantially diamond-shaped cross-section and the internal and external threads 10a and 10b formed thereby on the insert are of a standard or conventional form corresponding respectively with the thread 16 of the screw 13 and the thread 14 of the member 12.

A distinguishing feature of my insert 10 is that a portion thereof is of a different size or shape than its other portions so as to produce a gripping or holding action on one or the other of the threaded members with which the insert is used. This gripping effect is preferably applied to the externally threaded member 13 which is screwed into the insert, and I therefore show the insert 10 as having a portion or section 19 thereof of a relatively reduced size. A shown in Fig. 1 this relatively reduced portion is preferably located at an intermediate point of the bushing 10 and may be formed by winding one or more of the convolutions of such intermediate section to a smaller size or diameter than the end portions of the insert.

In Fig. 1 I show the insert 10 as having been screwed into the internally threaded opening 11 of the member 12 and in readiness to receive the screw 13 or other externally threaded member to be used therewith. In Fig. 2 I show the screw 13 with the stem thereof screwed into the insert 10 and with the head in clamping engagement with the plate 17 and washer 18. When the screw 13 is advanced into the insert 10, the threaded stem of the screw moves through and expands the convolutions forming the relatively reduced section 19 and these convolutions thereafter exert a gripping and holding effect on the screw which effectively prevents the screw from working loose. The locking or holding effect thus provided between the insert and screw effectively retains the latter against accidentally loosening but will not prevent the screw from being unscrewed if it should be desirable to do so.

Figure 3:
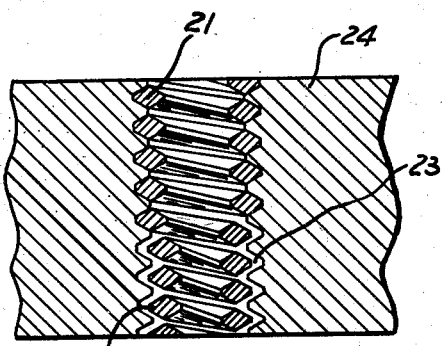
Fig. 3 is a longitudinal sectional view taken through another form of my thread insert and showing the same in an internally threaded or female member and without any threaded male member therein.

The gripping or holding effect just described above for the insert 10 can be obtained in various other ways; for example, in Fig. 3, I show an insert 21 which is similar to the insert 10 but which has an end section 22, differing in size or shape from the remaining portions of the insert. The insert 21 is also formed of helically wound wire and the relatively reduced end section 22 thereof may be formed by winding the wire for this portion to a relatively smaller diameter than for the other portions of the insert. When a screw or other externally threaded member is screwed into the insert 21, the relatively reduced section 22 is expanded by the externally threaded member and acts on the latter to grip or hold the same against accidental loosening. The relatively reduced end section 22 also facilitates the operation of screwing the insert into the internally threaded opening 23 of the body 24 with which the insert is to be used.

Figure 5:
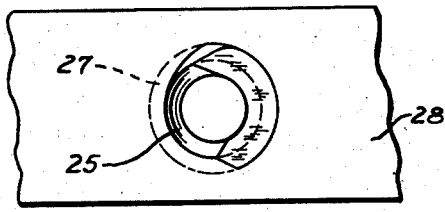
Figs. 5 and 6 are end views thereof.
Figure 4:
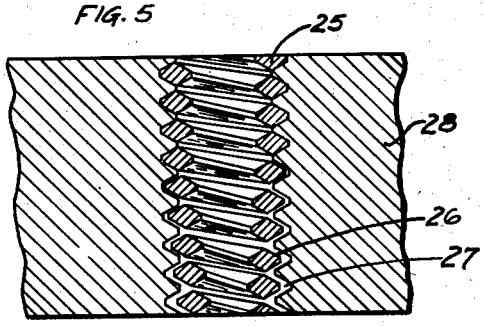
Fig. 4 is a longitudinal sectional view similar to Figs. 1 and 3 but illustrating still another form of my thread insert.
Figure 6:
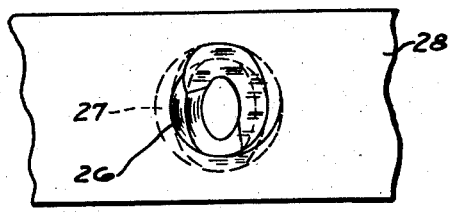

In Figs. 4, 5 and 6 I show still another thread insert 25 which embodies the holding or locking feature described above. The insert 25 also has a relatively reduced end section 26 which will exert a holding or locking action on an externally threaded member when the latter is screwed into the insert. The relatively reduced section 26 is of a tapering form and also varies from a circular or cylindrical shape to an oval shape at the extreme end of the insert as shown in Fig. 6. The taper on the relatively reduced section 26 and the change from round to oval cross-sectional shape enables this portion of the insert to exert a strong gripping action on an externally threaded member when screwed into the insert. The relatively reduced size of the end section 26 of this insert facilitates the operation of screwing the insert into the internally threaded opening 27 of the body 28 in which the insert is to be used.

Figure 2:
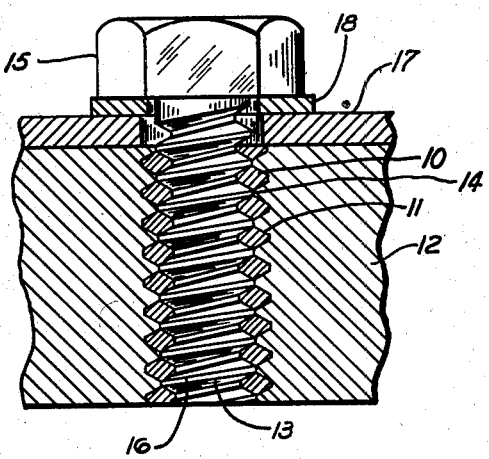
Fig. 2 is a view similar to Fig. 1 but showing a threaded male member screwed into the insert.

Although I have not shown threaded members actually screwed into the inserts 21 and 25 of Figs. 3 and 4, these inserts would resemble the insert 10 as shown in Fig. 2 after such externally threaded members have been screwed thereinto. In other words, the relatively reduced sections 22 and 26 of the inserts 21 and 25 will be expanded to substantially cylindrical shape by the externally threaded members which are screwed into these inserts.

From the foregoing description and the accompanying drawing it will now be readily understood that I have provided a novel form of thread insert, of the type formed from helically wound wire, and in which a portion of the insert is formed to a different size or shape than its other portions and exerts a holding or gripping effect on one of the threaded members with which the insert is used.

While I have illustrated and described my novel thread insert in more or less detail it will be understood, of course, that I do not wish to be correspondingly limited but regard my invention as including all changes and modifications coming within the spirit of the invention and the scope of the appended claims.

Having thus described my invention, I claim:

1. A thread insert of the character described for use with male and female members having preformed threads thereon comprising, a bushing formed of helically wound wire of a double-edged cross-sectional shape to provide internal and external helical threads on the bushing for cooperation with the preformed threads of said male and female members, the intermediate portion of said bushing being of a different size than its end portions so as to produce a gripping action between the bushing and one of said members.

2. A thread insert of the character described for use with male and female members having preformed threads thereon comprising, a bushing of helically coiled wire of a double-edged cross-sectional shape to provide internal and external helical threads on the bushing for cooperation with the preformed threads of said male and female member, said bushing having one or more convolutions in an intermediate portion thereof wound to a different diameter than the other portions of the bushing so as to produce a gripping action between the bushing and one of said members.

3. A thread insert of the character described for use with male and female members having preformed threads thereon comprising, a bushing formed of helically wound wire of a double-edged cross-sectional shape to provide internal and external helical threads on the bushing enabling the same to be screwed into the female member and to receive the threaded male member therein, the intermediate portion of said bushing being of relatively reduced diameter so as to grip said threaded male member.

4. An insert for use in an internally threaded opening and adapted to receive a threaded member therein comprising, a bushing formed of helically wound wire of a double-edged cross-sectional shape so as to provide the bushing with an external helical thread enabling it to be screwed into said opening and an internal helical thread enabling it to receive said threaded member therein, said bushing having one or more convolutions in an intermediate portion thereof wound to a relatively smaller diameter than its end portions so as to grip said threaded member.

HOWARD J. FINDLEY.